July 8, 1941.    J. E. GLEASON    2,248,168
CUTTER FOR CHAMFERING GEARS
Filed Oct. 7, 1938    2 Sheets-Sheet 1

James E. Gleason
INVENTOR

BY [signature]
ATTORNEY

July 8, 1941.   J. E. GLEASON   2,248,168
CUTTER FOR CHAMFERING GEARS
Filed Oct. 7, 1938   2 Sheets-Sheet 2

James E. Gleason
INVENTOR

BY B. V. Schlesinger
ATTORNEY

Patented July 8, 1941

2,248,168

UNITED STATES PATENT OFFICE 2,248,168

CUTTER FOR CHAMFERING GEARS

James E. Gleason, Rochester, N. Y., assignor to Gleason Works, Rochester, N. Y., a corporation of New York Application October 7, 1938, Serial No. 233,805

9 Claims. (Cl. 29—103)

The present invention relates to the chamfering of gears and particularly to the chamfering of spiral bevel and hypoid pinions.

In spiral bevel and hypoid gears and pinions, opposite side surfaces of the teeth form acute angular corners with opposite end surfaces of the teeth, the concave side surfaces forming acute angles with the outer end faces of the teeth and the convex side surfaces forming acute angles with the inner end faces of the teeth. If these acute angular corners are not removed, they are liable to break off when the gears or pinions are in use and may get in between the teeth, causing noise, wear and often serious damage. For this reason, it is customary to chamfer the opposite sides of the teeth of spiral bevel and hypoid gears and pinions at the opposite ends thereof before the gears or pinions are put into use. Machines have been devised for chamfering the teeth of spiral bevel and hypoid gears during the cutting of the teeth of the gears but, heretofore, the chamfering of the teeth of spiral bevel and hypoid pinions has been done either by hand or on special chamfering machines in which only a single tooth or a single end of a tooth is chamfered at a time and the pinion has to be indexed from tooth to tooth to permit all of its teeth to be chamfered.

The primary object of the invention is to provide a method and apparatus for chamfering pinions which will be simple, cheap and extremely fast.

Other objects of the invention will be apparent hereinafter from the specification and from the recital of the appended claims.

With the present invention, one end of all of the teeth of a pinion may be chamfered simultaneously and in a single stroke of a chamfering tool. The chamfering tool has the general shape of an internal gear and has the same number of teeth as there are teeth in the pinion to be chamfered.

For chamfering the two ends of the teeth of the pinion, two separate tools are required, one of the tools being made to a pitch and a pitch diameter approximately that of the pinion at its large end and the other tool being made of a pitch and pitch diameter corresponding approximately to that of the pinion at its small end. Each chamfering tool is adapted to have a telescoping relation with the teeth of the pinion during chamfering. Each is mounted coaxially of the pinion and is moved axially relative to the pinion to effect the chamfering operation. The tool for chamfering the large ends of the pinion teeth is preferably moved from the large end of the pinion inwardly, while the tool for chamfering the small ends of the pinion teeth preferably moves from the small end of the pinion inwardly. In the preferred embodiment of the invention, the teeth of each chamfering tool are made with profiles complementary to the profiles of the tooth surfaces to be chamfered so that the chamfering operation removes a uniform amount of stock from the tooth over its whole height. The teeth of the chamfering tool are made, however, of slightly less width than the tooth spaces of the pinion so that they will clear those sides of the teeth of the pinion which do not require to be chamfered. The tools are moreover made preferably with teeth inclined to the axis of the tool, that is, the tools have preferably the form of internal helical gears. In this way, cutting clearance will be provided back of the cutting edges of the teeth of the tools.

Figure 1:
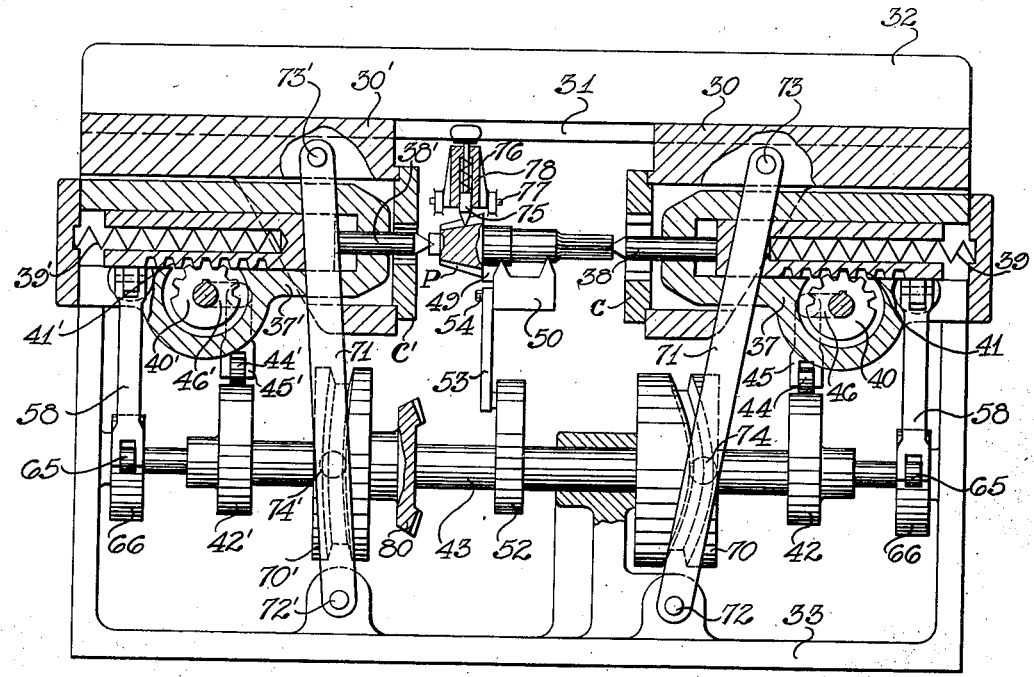
Fig. 1 is a vertical sectional view illustrating more or less diagrammatically the construction and operation of a chamfering machine constructed according to one embodiment of this invention.
Figure 2:
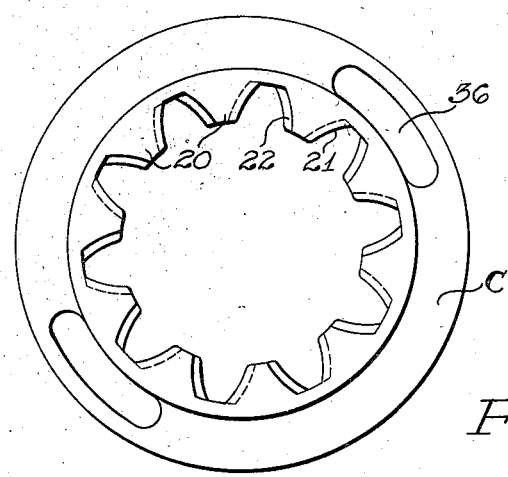
Fig. 2 is an end view of one of the chamfering tools.

The machine illustrated in the drawings is shown set up to chamfer teeth of a spiral bevel or hypoid pinion P. Such a pinion is of generally conical shape and has longitudinally curved teeth T, (Fig. 3), whose concave sides 10 normally form acute angles with the outer end surfaces 11 of the teeth and whose convex side surfaces 12 normally form acute angles with the inner end faces 13 of the teeth. To remove the acute angular corners 15 and 16 thus formed at opposite ends of the teeth is the purpose of the present invention.

The chamfering tools which are employed are denoted at C and C', respectively. Each tool is of internal gear form and has as many teeth as there are teeth in the gear or pinion to be chamfered. The two tools are of the same general construction, but the tool C which is to chamfer the large ends of the teeth T of the pinion has a pitch diameter approximately that of the pitch diameter of the pinion at its large end and the circular pitch of its teeth is approximately equal to the circular pitch of the teeth of the pinion at its large end while the tool C', which is to chamfer the small ends of the teeth of the pinion, is made to approximately the pitch diameter of the pinion at its small end and to the circular pitch of the teeth of the pinion at the small end. The profile shape or contour of the teeth of one tool is, moreover, complementary to the profile shape or contour of the teeth of the pinion at its large end while the profile shape or contour of the teeth of the other tool is complementary to the profile shape or contour of the teeth of the pinion at the small end thereof. Inasmuch, however, as the two tools are generally similar in construction, one only has been illustrated in detail.

This tool C has the same number of teeth 20 as there are teeth T in the pinion to be cut. The teeth 20 are preferably made with side surfaces 21 and 22 which are of concave profile approximately complementary to the profile shape of the teeth of the pinion at its large end. As already stated, the circular pitch of the teeth 20 is approximately equal to the circular pitch of the teeth T of the pinion at the large ends of the teeth although the teeth 20 of the tool may be made of slightly less thickness than the tooth spaces of the pinion so that the non-cutting sides of the tool will readily clear those sides of the teeth of the pinion which require no chamfering. The tool C has side-cutting edges formed at the juncture of the side faces 21 of its teeth and the front faces 24 thereof. The sides 21 are inclined to the axis 23 of the tool to provide clearance back of the cutting edges. The sides 22 of the teeth are non-cutting sides and may extend in the direction of the axis of the tool or be inclined thereto. They do not have to be given a profile shape but such a shape may be provided for convenience to insure complete clearance between the non-cutting side 22 and the adjacent tooth surface of the pinion. Preferably the sides 22 are shaped and made to extend longitudinally parallel to the sides 21. The tool has then the form of an internal helical gear and its teeth may readily be cut on a Fellows-type gear shaper in a single operation.

The tool C' has cutting edges formed at the juncture of the sides 26 of its teeth 27 and the front faces 28 thereof. The sides 29 of the teeth of the cutter C' are non-cutting sides. In the drawings, the tools are shown as sharpened so that the front faces 24 and 28, respectively, of their teeth lie in planes perpendicular to the axes of the tools. The individual teeth may, however, be sharpened with a side rake or with a hook to increase the cutting action if desired.

In use, the two cutting tools C and C' are mounted to be coaxial of the pinion P whose teeth are to be chamfered. In the machine illustrated, the two tools are secured to rams 30 and 30', respectively, which are mounted to reciprocate toward and from one another on a dovetailed guide-way 31 which is formed on the under surface of an arm 32 which is integral with the frame 33 of the machine. Each tool may be secured to its ram in any suitable manner, as by means of screws (not shown), which pass through arcuate slots 36 formed in the tool and which thread into the rams.

Integral with the frame 33 or secured thereto in any suitable manner are a pair of guides or supports 37 and 37'. The adjacent ends of these supports project through openings formed in the rams 30 and 30'. Two centers 38 and 38' for supporting the pinion P, which is to be chamfered, are slidably mounted in these supports 37 and 37', respectively. Coil-springs denoted at 39 and 39', respectively, are provided for seating the centers against opposite ends of the work and the two centers may be moved into or retracted from operative position by segmental gears 40 and 40', respectively, which mesh with rack teeth 41 and 41', respectively, that are formed on the centers.

The segments 40 and 40' are operated from peripheral cams 42 and 42', respectively, that are secured to a shaft 43 which is journaled in the frame of the machine. The cams 42 and 42' engage rollers 44 and 44', respectively, that are carried by arms 45 and 45', respectively, which are pivotally connected to arms 46 and 46', respectively, that are keyed or otherwise secured to the shafts on which the segments 40 and 40', respectively, are fastened.

Figure 6:
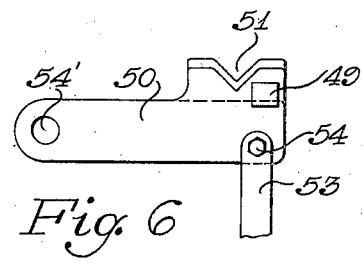
Fig. 6 is a fragmentary detail view of the work rest of the machine.

The machine illustrated is of the horizontal type, that is, it is intended to operate with the work in horizontal position. For this reason, it is necessary to provide some temporary support for the work until the centers 38 and 38' are in operative position. To this end, an arm or rest 50 is provided (Figs. 1 and 6). This rest has spaced sockets or recesses 51 of V-shape to receive the shank of the pinion P and it is provided with a stop 49 against which the back-cone of the pinion may be seated to determine the axial position of the pinion.

After the centers 38 and 38' have moved into operative position and hold the pinion, the arm or rest 50 is dropped out of the way. For this purpose, a face-cam 52 is provided. This cam is secured to the shaft 43 and engages a roller or follower that is carried by a rod 53 which is pivotally connected at 54 to the arm 50. The arm 50 is itself pivotally mounted at 54' on the frame of the machine.

Figure 5:
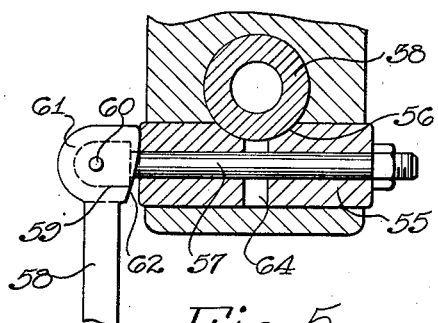
Fig. 5 is a detail sectional view, showing the mechanism for clamping one of the work centers.

When the centers 38 and 38' have engaged the pinion P, they are clamped or locked in engaging position. For this purpose, clamping blocks (Fig. 5) are provided. There are two blocks 55 for each center. The blocks are formed with arcuate clamping surfaces as indicated at 56 to engage the periphery of the center. The pair of blocks of each set are mounted for sliding movement on a rod or pin 57. A lever 58, that is bifurcated at its upper end, is pivotally connected to the head 59 of this rod by a pin 60. The ears 61 of each lever 58 are formed with cam surfaces 62 which are adapted to engage the adjacent end face of one of the blocks 55 so that when the lever 58 is moved in one direction, the blocks 55 are forced together to clamp the center with which they are associated. When the lever is moved in the opposite direction, the center is released. Each lever 58 carries a roller or follower 65 at its lower end which engages the periphery of a cam 66. The two cams 66 are secured in any suitable manner to the shaft 43.

When the centers 38 and 38' have been moved into engagement with the pinion P to be chamfered and have been clamped in engaging position and when the rest or support 50 has been swung down out of operating position, the two rams 30 and 30' are moved toward one another to move the chamfering tools C and C' axially and effect the chamfering operation at opposite ends of the teeth of the pinion P. The rams are operated from cams 70 and 70', respectively.

These cams are secured to the shaft 43. They are operatively connected with the rams 30 and 30' by levers 71 and 71', respectively. These levers are pivotally mounted at their lower ends on the frame 33 of the machine by means of pins 72 and 72', respectively, and they are pivotally connected at their upper ends to the rams 30 and 30', respectively, by means of pins 73 and 73', respectively. The two levers carry rollers or followers 74 and 74', respectively, intermediate their ends which engage the tracks of the two cams 70 and 70'. For a shank pinion, such as shown in Fig. 1 of the drawings, the tool C will be required to travel a greater distance than the tool C' in order to effect the chamfering operation and the track of the cam 70 will be formed accordingly, as shown, to give this greater travel.

It is necessary, of course, to position the teeth of the pinion relative to the cutting teeth of the tools so that in their strokes, the tools will effect the chamfering operation. For this purpose, a gauging finger 75 may be provided. This finger is mounted in an arm 76 that is pivotally secured by means of the pin 77 to the frame of the machine. It is intended to be engaged with a tooth space of the pinion P. It may be swung up out of the way manually to permit removal of a chamfered pinion and positioning of a new workpiece. A coil spring 78 that is housed in the arm 76 serves to resiliently urge the finger 75 into gauging position.

The shaft 43 may be driven from a motor or other suitable source of power (not shown) through gearing which includes the bevel gear 80 that is fastened to the shaft.

In use, a pair of tools C and C' are selected which are suitable for chamfering the opposite ends of the teeth of the gear which is to be chamfered and these tools are secured to the rams 30 and 30'. When the machine is stopped, it stops with the arm 50 in raised position and the rams 30 and 30' and the centers 38 and 38' retracted from operative position. To chamfer a pinion, the operator lays the pinion on the arm or rest 50. He then engages the finger 75 in a tooth space of the pinion P to properly position the teeth of the pinion with reference to the teeth of the chamfering tools. When this has been done, the operator starts the machine. This causes the shaft 43 to be driven through the gear 80. As the shaft 43 rotates, the center 38' is first brought up into operative position by action of the cam 42' through the segment 40' and the rack 41'. This center forces the pinion P against the shoulder 49 of the rest 50 to position the pinion axially and then the center is positively seated by the spring 39'. Then the center 38 is brought into engagement with the opposite end of the pinion by operation of the cam 42, segment 40 and rack 41 and is seated by action of the spring 39. The centers are then clamped by action of the cams 66 through the medium of the levers 58 and the clamping blocks 55. Then, as the shaft 43 continues to rotate, the cam 52 operating through the rod 53 withdraws the rest or support 50 from operative position and the pinion remains suspended between the centers 38 and 38'. The rams 30 and 30' now move toward one another under actuation of the cams 70 and 70'. When the teeth of the tools C and C' come into engagement with the teeth of the pinions, they clip the corners 15 and 16, respectively, off the opposite ends of these teeth, thus effecting the desired chamfering operation. As soon as the corners have been clipped off of the teeth of the pinion, the rams 30 and 30' reverse under actuation of the cams 70 and 70' and the tools C and C' are retracted to the positions shown in Fig. 1. Then the cams 66 operate to release the centers 38 and 38'. Following this, the cam 52 operates to move the rest or support 50 up into operative position again and then the cams 42 and 42' operate to retract the centers 38 and 38' from engaging position. The cycle of operation of the machine is completed and the operator can remove the chamfered pinion from the machine and substitute another in its place.

Figure 3:
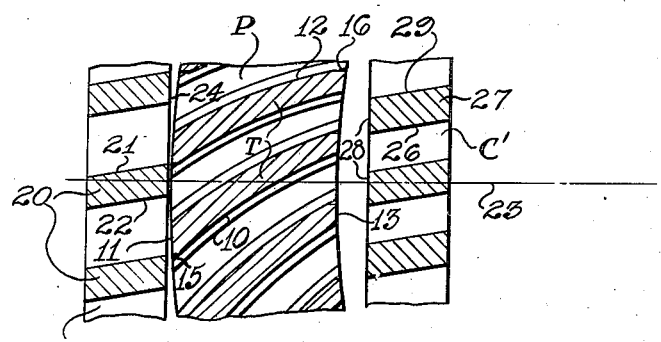
Figs. 3 and 4 are a developed sectional view and a transverse sectional view, respectively, illustrating the chamfering process of this invention.
Figure 4:
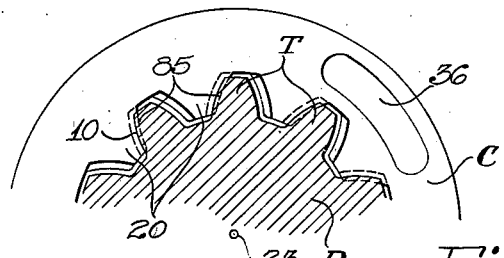

The correct angular relation between the teeth of the chamfering tools and the teeth of the pinion is illustrated clearly in Figs. 3 and 4. It is such that when the tools are moved axially they will take off the desired amount of stock from the ends of the pinion teeth. The cutting edges of the teeth of the chamfering tool are denoted at 85 in Fig. 4 while the sides of the pinion teeth which are to be chamfered are denoted at 10. As the tool C moves axially forward it will clip off the stock between the edges 85 and the sides 10 of all the teeth simultaneously removing the corners denoted at 15 in Fig. 3. As the tool C' moves axially rearwardly, it will clip off all the corners 16. Thus the corners at one end of all of the teeth of the pinion are removed simultaneously and in one cutting stroke of a chamfering tool.

In the preferred arrangement, as described, the two tools C' move from opposite ends of the pinion simultaneously to chamfer the opposite ends of the teeth and thereby the cutting thrusts of the two tools are balanced one by the other. It will be obvious, however, that the two tools may cut alternately if desired.

While the invention has been described particularly in connection with the chamfering of the teeth of spiral bevel and hypoid pinions, it will be obvious that the invention may be applied also to the chamfering of the teeth of skew bevel gears and of helical spur gears, that is, to the chamfering of any gears whose teeth are inclined to the axis of the gear. Further than this, it will be obvious, also, that the invention may be applied to the chamfering of the teeth of helical internal gears by using a tool of external spur gear form having cutting teeth extending either in the direction of its axis or teeth with a different inclination to its axis than the teeth of the internal gear to be chamfered. The chamfering is here effected, as in the embodiment of the invention illustrated, by axial reciprocation of the chamfering tool.

In general it may be said that while the invention has been illustrated in connection with a particular embodiment thereof, it is capable of still further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A tool for chamfering gears which is of gear form and which is adapted to be mounted in registry with the gear to be chamfered so that the gear and tool have the relation of axially coincident gears, said tool having a number of cutting teeth equal to the number of teeth of the gear to be chamfered, each cutting tooth having side-cutting edges formed at the junctures of its front face and its sides.

2. A tool for chamfering gears in the form of an internally toothed member having a number of cutting teeth equal to the number of teeth of the gear to be chamfered, each cutting tooth having side-cutting edges formed at the junctures of its front face and sides.

3. A tool for chamfering gears in the form of an internally toothed member having a number of cutting teeth equal to the number of teeth of the gear to be chamfered, said teeth having profile shapes approximately complementary to the profile shapes of the gear teeth to be chamfered, and each cutting tooth having side-cutting edges formed at the junctures of its front face and its sides.

4. A tool for chamfering gears having a plurality of internally arranged cutting teeth which are equal in number to the number of cutting teeth of the gear to be chamfered, each cutting tooth having a cutting edge formed at the juncture of one side and one end face of a tooth, said side faces of the teeth being inclined to the axis of the tool.

5. A tool for chamfering gears having a plurality of circularly arranged cutting teeth, each tooth having a cutting edge formed at the juncture of one side and one end face of the tooth, said side faces being of a profile curvature approximately complementary to the profile curvature of the tooth surfaces of the gear to be chamfered.

6. A tool for chamfering gears in the form of an internally toothed member adapted to completely encircle the gear to be chamfered, the teeth of the tool being equal in number to the teeth of the gear to be chamfered and being approximately complementary thereto in profile shape and being inclined longitudinally to the axis of the tool.

7. A tool for chamfering the side tooth surfaces of a gear which has side tooth surfaces that are inclined to the axis of the gear, said tool having a plurality of internally arranged cutting teeth which are equal in number to the teeth of the gear to be chamfered and which have side-cutting edges formed at the junctures of their front faces and their sides, and said tool being adapted to be mounted in registry with the gear to be chamfered so that the gear and tool have the relation of axially coincident gears.

8. A tool for chamfering the side tooth surfaces of a gear which has side tooth surfaces that are inclined to the axis of the gear, said tool having a plurality of internally arranged cutting teeth which are equal in number to the teeth of the gear to be chamfered and which have profile shapes approximately complementary to the profile shapes of the side tooth surfaces of the gear to be chamfered, each cutting tooth having side-cutting edges formed at the junctures of its front face and its sides, and said tool being adapted to be mounted in registry with the gear to be chamfered so that the gear and tool have the relation of axially coincident gears.

9. A tool for chamfering the side tooth surfaces of a gear which has side tooth surfaces that are inclined to the axis of the gear, said tool being of a diameter such as to completely encircle the gear to be chamfered when the tool and gear are brought into registry with their axes coincident, said tool having a plurality of internally arranged cutting teeth which are equal in number to teeth of the gear to be chamfered and which are approximately complementary thereto in profile shape and which have side-cutting edges formed at the junctures of their front faces and their sides.

JAMES E. GLEASON.